Patented Jan. 10, 1939

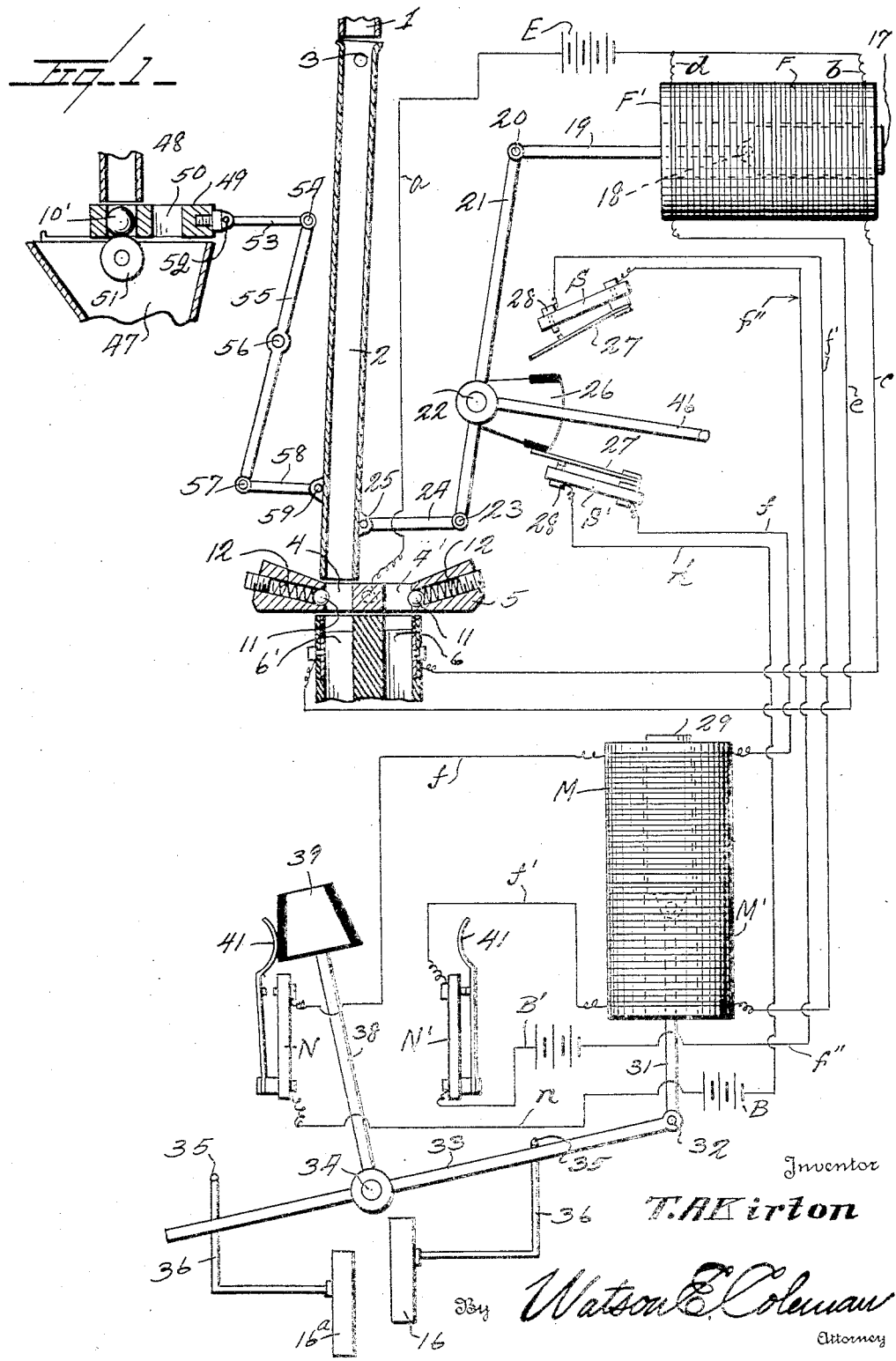

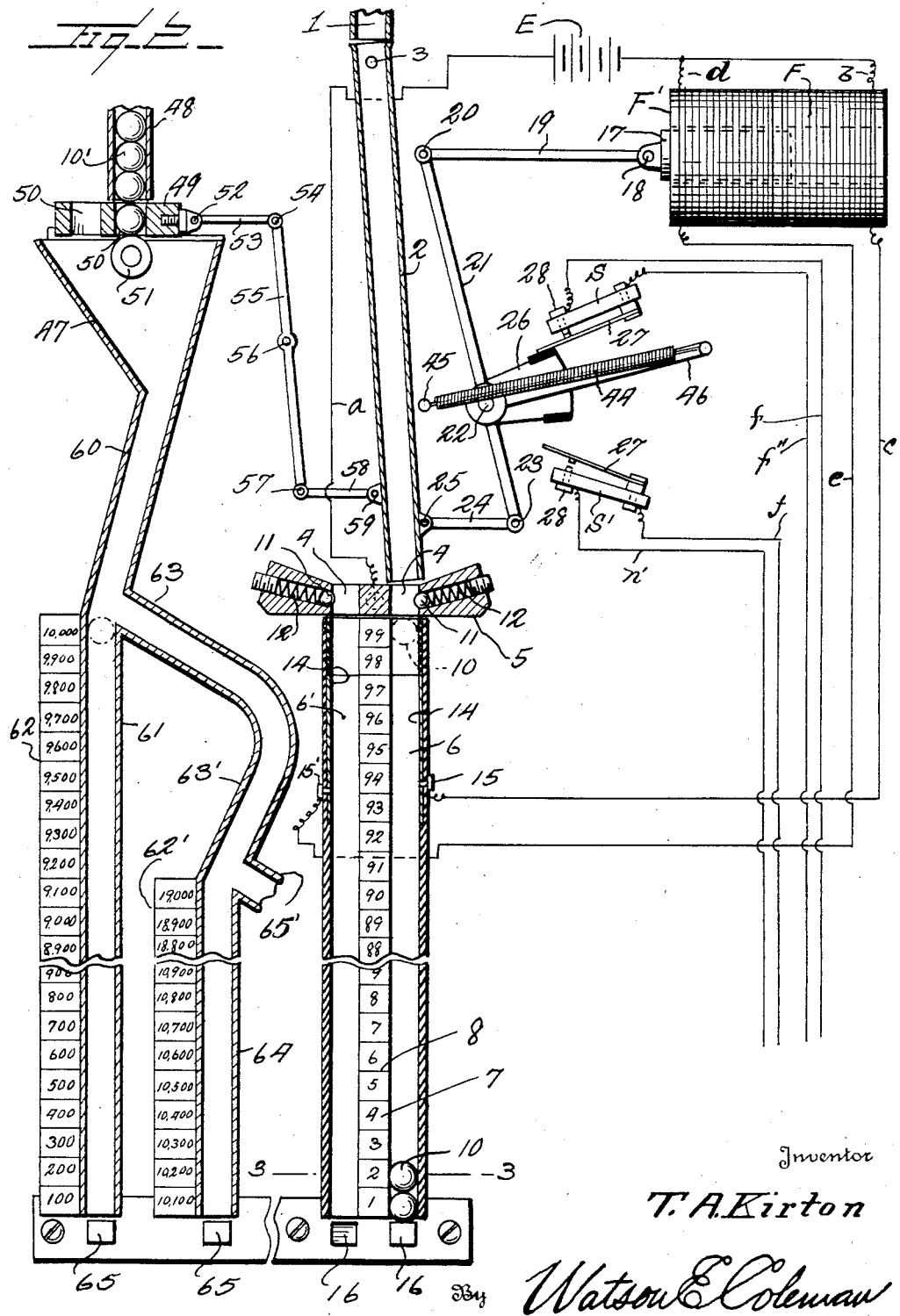

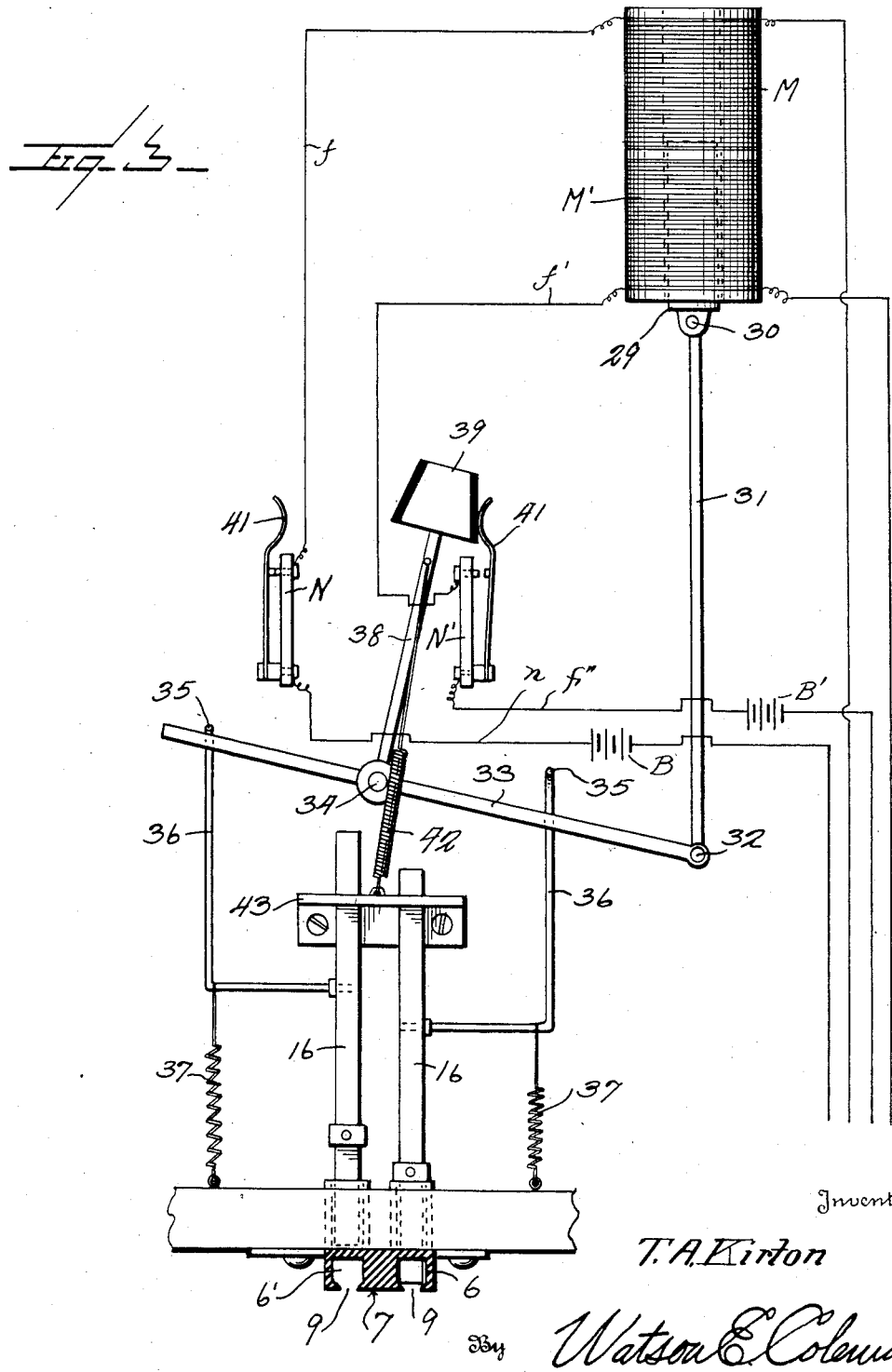

2,143,735

UNITED STATES PATENT OFFICE 2,143,735

TABULATING APPARATUS

Thomas A. Kirton, Jacksonville, Fla., assignor of one-tenth to B. R. Daley, Jacksonville, Fla.

Application August 20, 1935, Serial No. 37,056

15 Claims. (Cl. 235—68)

This invention relates to a tabulating apparatus, and it is an object of the invention to provide an apparatus of this kind to be used primarily at racetracks to tabulate accurately and quickly the dollars wagered on each entry as well as the total amount for win, place and show.

It is also an object of the invention to provide an apparatus of this kind wherein there is a calculating mechanism for each entry to win, place and show together with a mechanism to count or tabulate the total amount played on all entries to win, place or show, and wherein each of such mechanisms is under control of tokens or checks released at the time of purchasing the tickets.

The invention consists in the details of construction and in the combination and arrangement of the several parts of my improved tabulating apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a diagrammatic view with parts in section illustrating a tabulator or counting mechanism constructed in accordance with an embodiment of my invention;

Figure 2 is a view similar to Figure 1 showing certain of the parts in a second position and also including totalizing mechanism;

Figure 3 is a view also of a diagrammatic character in top plan and partly in section illustrating in a second position certain of the parts illustrated in Figure 1.

As the mechanism for counting or tabulating each position for each entry and also for totalizing are the same it is believed unnecessary to describe and illustrate more than one of such mechanisms. It is to be understood, however, that associated with each entry will be a mechanism to indicate the total amount wagered to win, place or show on that entry and that in connection with the totalizer for each entry there will be a grand totalizer operating to show the total amount wagered on all entries to win, place or show. Relative to the mechanism for each entry, the same will be selectively operated upon the purchase of a ticket for that entry while the totalizing mechanisms will operate upon purchase of tickets for either win, place or show.

As disclosed in the accompanying drawings, my improved mechanism comprises a chute 1 leading from a hopper or other source of supply for checks or tokens which are preferably small metallic balls. Upon the purchase of a ticket the desired number of balls representing the value of the ticket will be released from the source of supply and permitted to pass through the chute 1 and delivered to the chute 2 through the upper open end thereof.

The chute 2 is pivotally supported at its upper portion, as at 3, for swinging movement with the open upper end of said chute 2 at all times in effective communication with the lower or discharge end of the delivery chute 1.

The chute 2 is of any desired length and is intended to be intimately swung in opposite directions to bring the lower open end of the chute 2 alternately into communication with one or the other of the openings 4 which are provided in a head 5 of brass or other conductive material. Disposed below the openings 4 are the parallel tubes 6 and 6'. These tubes 6 and 6' have their walls constructed of electrically non-conductive material and the tubes are spaced apart to provide an intervening space 7 extending from one end of the tubes to the other and carrying graduations 8 numbered consecutively upward from 1 to 99. The outer wall of each of the tubes 6 and 6' is provided with a slot 9 whereby the number of balls within the chute may be seen.

The openings 4 of head 5 are each partly intersected by a spring pressed pawl 11, the tension of the associated spring 12 permitting the downward movement of a token 10 through the opening 4 into either one of the tubes 6 or 6' but detaining any token against upward movement.

The upper portion of each of the tubes 6 and 6' has its wall provided with a metallic lining plate or strip 14 which extends from a point near the top of the tube 6 or 6' downwardly therefrom to any desired distance. The metallic head 5 is in electrical connection through a conductor $a$ with a source E of electrical energy and through a conductor $b$ is in electrical connection with one terminal of a solenoid F. The opposite terminal of this solenoid has leading therefrom a conductor $c$ which is in electrical connection, as at 15, with the conductive strip 14 in the tube 6. The source E is also in electrical connection through conductor $d$ with the terminal of a solenoid F', the opposite terminal of which is electrically connected by conductor $e$ with strip 14 at 15' in the other tube 6'.

The lower ends of the tubes 6 and 6' are open but associated with said open ends are the reciprocatable horizontally disposed gates 16. The stops or gates are shifted in unison in opposite directions so that one of the gates 16 is in an open position with respect to its tube 6 or 6' when the other gate is in its tube closing position.

In Figure 2 the tube 2 is shown as delivering into the opening 4 communicating with chute 6. At this time the gate 16 associated with said chute 6 is in its tube closing position. As the tokens build up within the tube 6, they will indicate in coaction with the graduations, the amount of tickets sold on a selected entry to win, place or show. The tokens are of metal and when the tokens reach the upper portion of the tube 6 or 6', the uppermost token or a number of said tokens at the top of the tube will contact with the strip 14 so that when the tube 6 or 6' has been completely filled, the uppermost one of said tokens will electrically engage the metallic head 5 and a circuit will be closed through the strip 14, the uppermost token 10 and the head 5 resulting in energizing the solenoid F through the conductors a, b and c. This results in the core 17 being retracted into the solenoid F. The outer end portion of the core 17 is connected at 18 with a link 19 connected at 20 to a lever 21. This lever 21 is pivoted at 22 for swinging movement, and the lower end of lever 21 is connected at 23 with a link 24 in turn pivotally connected at 25 to the lower portion of the swinging chute 2. The pivot of lever 21 is so positioned that upon a full retraction of the core 17, the lower end of the lever 21 will be swung a distance sufficient to swing the discharge end of the chute 2 into register or communication with the opening 4 of the head 5 and in communication with the tube 6'.

Carried at the pivotal center of lever 21 and rocking therewith is a fibre rock arm 26 which extends between the spring supported contacts 27 of switches S and S'. The contact 27 of each of the switches is resilient and normally maintains the contact 27 in an open position. As the chute 2 is moved into the position illustrated in Figure 1, the arm 26 will engage with the contact 27 of the switch S' and move it into electrical engagement with the stationary contact 28 of said switch S'. This closes the circuit f in which is interposed a solenoid M and the normally closed switch N as illustrated in Figures 1 and 3. Upon energizing of solenoid M, the core 29 is retracted into the solenoid M. This core 29 has operatively connected therewith, as at 30, a rod 31 which is operatively connected at 32 with lever 33. This lever is pivoted at 34. As core 29 is retracted within the solenoid M, the portion of the lever 33 between the arm 31 and the pivot 34 engages a stop 35 carried by a bracket 36 fixed to the member 16 associated with the tube 6. The continued movement of the lever 33 will shift the gate 16 into open position with respect to the bottom of the tube 6 and thus allow the discharge of the tokens 10 within said chute 6 which will be collected as may be desired. There are two of the gate actuating stops 35, one on each side of the pivot 34.

Each of the brackets 36 has associated therewith a retractile spring 37 urging the gates 16 into closed position across their respective tubes 6 and 6' and, therefore, as the free end portion of the lever 33 swings toward the tube 6' the gate 16 associated with said tube 6' will move into closed position.

Projecting from the pivotal center of the lever 33 is a rock arm 38, the outer end portion of which carries a head 39.

The operation of this mechanism is as follows:
Assuming the parts to be in the position shown in Figure 1, then when the tube 6' is filled with tokens and the uppermost ball or token contacts with the head 5, a circuit will be completed which includes the solenoid F' and the source of current E. This will energize the solenoid F' and cause the core 17 to be drawn to the left in Figure 1, shifting the chute 2 over to opening 4'. This movement of lever 21 will cause arm 26 to close switch S, which will close a circuit through the solenoid M', the source of current B' and the normally closed switch N'. The solenoid M' will draw the core 29 from the solenoid M into the solenoid M' and lever 33 will be shifted to open the gate 16a and allow the gate 16 to close under the pull of spring 37, thus permitting the discharge of tokens from tube 6'. As the lever 33 swings under the action of the solenoid M', the head 39 will swing over and open the switch N', allowing the switch N to close. When the tube 6 becomes filled with tokens, the circuit will be completed through the solenoid F, the solenoid will be energized, the core 17 will move to the right in Figure 1 swinging chute 2 over tube 6', arm 26 will close switch S', which closes a circuit through the solenoid M, which will shift the core 29 into solenoid M, returning the parts to the position shown in Figure 1.

Disposed on each side of the head 39 are the switches N and N', each having a spring contact 41 urged by its resilience to a closed position. When the lever 33 swings to the position shown in Figure 1, to permit the closing of gate 16a and cause the opening of gate 16, the switch N will be opened and when the lever swings in the opposite direction to open gate 16a and close gate 16, the switch N will close and the switch N' will be opened. The switch N is electrically connected with a battery B or other current source by a wire n, and from switch N extends a conductor f to the solenoid M and from thence conductor f extends to the switch S' and from this switch back to the battery B by a conductor n'. The switch N' is connected on one side to a battery or source of current B' and on the other side by a wire f' to the solenoid M' and from thence the wire f' extends to the normally open switch S, the other side of this switch being connected to the battery B' by return wire f''. These switches N and N' are for the purpose of cutting off the current and preventing its being wasted at the time when one or the other of the tubes is filling with balls or tokens and the solenoids are not required to operate.

The lever 33 is snapped quickly to the limit of its swinging movement in either direction by the retractile spring 42 secured to a suitable support 43 and to the arm 38 at a point outwardly from the pivotal mounting 34. As this arm 38 passes its center in swinging in either direction, the spring 42 will suddenly snap the lever 33 to the limit of its movement in such direction.

The lever 21 hereinbefore referred to is also snapped quickly to the limit of its movement in either direction by a retractile spring 44 anchored at one end, as at 45, to a suitable support and to an outstanding rock arm 46 extending from the lever 21 at its pivot 22.

As herein disclosed each of the tubes 6 and 6' together with its associated opening 4 in slide 5 is intended to collect one hundred balls and if at the time the chute 2 is shifted from one position to the other there be any additional balls therein they will be prevented from dropping out of chute 2 during its movement.

The lower end of the chute 2 is sufficiently close to the upper face of the plate 5 to assure the carrying off with the movement of the chute 2 any of the checks or tokens 10 in excess of one hundred or other predetermined number.

Supported adjacent to the chute 2 as shown in Figure 2 is a hopper 47 which is positioned below a discharge tube 48 leading from a source of supply of tokens 10' also preferably balls though these do not have to be conductive. Immediately below but close to the discharge end of the tube 48 is a reciprocatable slide 49, said slide 49 having two openings 50 spaced apart in the direction of movement of the slide 49 and which openings 50 are alternately brought into register with the discharge end of the tube 48. Below the tube 48 and slide 49 and in alignment with the tube 48 is a support 51 for the slide 49, in the form of a roller mounted within the upper portion of the hopper 47. This support 51 is of such diameter and so positioned as to prevent discharge of a token or check 10' through an opening 50 in the slide 49 when the roller 51 is in register with the tube 48. The slide 49, on reciprocation carries opening 50 to one side or the other of the support 51 so that a token will be carried to one side or the other of the support 51 and allowed to drop within the chute 47.

In the present embodiment of my invention, one end of the slide 49 has operatively connected thereto, as at 52, a rigid link 53 operatively connected, as at 54, with an end of a lever 55. This lever 55 midway of its ends is supported, as at 56, for rocking movement with the lower end of said lever 55 operatively connected, as at 57, with a rigid link 58 in turn operatively connected, as at 59, with the lower end of the chute 2 and at such a point on said chute 2 that upon swinging movement of the chute 2 in either direction the slide 49 will be moved endwise a distance sufficient to effect a discharge of a token 10' into the hopper 47.

The lower portion of the hopper 47 is continued by a tube 60 which is disposed lengthwise on an incline toward the upper receiving end of a vertically disposed tube 61. This tube may be entirely transparent or partially transparent to permit the tokens therein to be seen in connection with the graduation 62. The tube 61 is provided therealong with the graduations 62 consecutively numbered in hundreds from "100" to "10,000" or in a multiple of the total value of the tokens received within the chute 6 or 6' before shifting of the chute 2. As the chute 2 is shifted in either direction the resultant movement of the slide 49 will effect a discharge of a token 10' into the hopper 47 through the tube 60 into the tube 61. The tokens 10' will build up in the tube 61 until the graduation "10,000" has been reached whereupon subsequent tokens will be deflected by the uppermost token in the tube 61 into the branch chute 63 leading from the top end of the tube 61 to and delivering into a second calculating tube 64. This chute 63 is provided with a branch 63' which is inclined downward toward the chute 64. It will be seen that the chute 63 curves outward and then downward and inward as at 63' towards the tube 64 so that the lower end of this chute 63 does not incline toward a branch 65. This inclination of the lower portion of chute 63 toward the tube 64 and away from the branch 65 is of importance as it assures the delivery of the token into the tube 64 until said tube 64 is filled. The tube 64 also has disposed therealong graduations 62' which are consecutively numbered in hundreds from "10,100" to "19,000". The upper portion of this tube 64 has leading therefrom a branch chute 65' which is intended to discharge into another tabulating tube, as many tabulating or calculating tubes being used as the requirements of practice may necessitate.

The lower end of each of the tubes 61 and 64 and others which may be used is normally closed by a slide 65. This slide may be moved into open position when it is desired to discharge the tokens collected within the tubes 61, 64, etc. as for instance at the end of each race. It is also to be understood that at the end of each race the member 16 at the lower end of either the tube 6 or 6' will be opened to effect the discharge of any checks or tokens 10 which may be within such chute.

The tubes 6 and 6' constitute token displaying tubes, that is, each of these tubes is to be so constructed that the number of tokens gathered in the tube may be readily observed. To this end, each of these tubes may be made of glass or may be made of any other material with a transparent strip extending longitudinally of the tube or may be longitudinally slitted from end to end whereby the height of the tokens within the tubes may be observed and the term "display tubes" as used in the claims is intended to cover any one of these different constructions whereby the height of the tokens within the tubes 6 and 6' may be displayed to an observer.

From the foregoing description it is thought to be obvious that a tabulating apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A tabulator including two parallel display tubes constructed and arranged to receive tokens and support them in the tubes in approximately alined superposed position, the tubes having an internal diameter slightly greater than the diameter of the tokens, graduations visually associated with the tubes and indicating the number of takens collected in a tube, a delivery chute having an internal diameter substantially the same as a token, the chute being mounted for movement into or out of register with either of the display tubes, means controlled by the uppermost token and acting, when the tokens in one tube have accumulated therein to a predetermined height to automatically shift the chute from the last named or filled tube to a position over the other or empty tube, and means for discharging the tokens collected in the filled tube.

2. A tabulator including two parallel display tubes constructed and arranged to receive tokens and support them in the tubes in approximately alined superposed position, the tubes having an internal diameter slightly greater than the diameter of the tokens, graduations visually associated with the tubes and indicating the number of takens collected in a tube, a delivery chute having a diameter substantially the same as a token, the chute being mounted for movement into or out of register with either of the said display tubes, means controlled by the uppermost token and acting when the tokens in one display tube have accumulated therein to a predetermined height automatically to shift the chute from the filled display tube to a position over the empty display tube, and token controlled means acting automatically upon the movement of the chute to a position over the empty tube releasing the tokens from the lower end of the filled tube and closing the lower end of the empty tube.

3. A tabulator including two parallel display tubes constructed and arranged to receive tokens and support them within the tube in approximately alined superposed position, the tubes having an internal diameter slightly greater than the diameter of the tokens; graduations visually associated with the tubes and indicating the number of tokens collected in either tube; means for discharging tokens into either one of said tubes, gates disposed at the lower end of each of said tubes; token actuated means, acting when the tokens in one tube have accumulated therein to a predetermined height, to automatically shift the discharging means from a filled tube to a position over an empty tube, and means automatically actuated by said discharging means and upon a movement thereof acting to withdraw the gate from below the filled tube and project the gate into a position below the empty tube.

4. A tabulator including two parallel display tubes, means for discharging tokens into either one of said tubes, the tubes having a diameter slightly greater than the tokens whereby the tokens will be supported in approximate alinement and in superposed position; a totalizing display tube; means for discharging tokens one by one into said last named tube; means actuated by the uppermost token, when the tokens in either one of the pair of display tubes have reached a predetermined height, acting automatically to shift the discharge means to discharge tokens into the other tube; means actuated by the discharge means and acting, when the discharge means is shifted automatically, to release the tokens in the filled tube; and means actuated by said discharge means and acting automatically to release a single token into the totalizing tube upon each shifting movement of the discharge means, the several display tubes each having visually associated graduations indicating the number of tokens collected in any one display tube.

5. A tabulator including two parallel display tubes constructed and arranged to receive tokens and support them within the tube in approximately alined superposed position, the tubes having an internal diameter slightly greater than the diameter of the tokens; graduations visually associated with the tubes and indicating the number of tokens collected in each tube, shiftable means for delivering tokens into either one of said tubes; token actuated means acting, when a predetermined number of tokens in one tube have accumulated therein to a predetermined height, to automatically shift the delivery means from a position over the filled tube to a position over the empty tube, said means including a normally open operating circuit, and token actuated means automatically closing said circuit when the tokens have accumulated to said predetermined height.

6. A tabulator including two parallel display tubes constructed and arranged to receive tokens and support them within the tube in approximately alined superposed position, the tubes having an internal diameter slightly greater than the diameter of the tokens; graduations visually associated with the tubes and indicating the number of tokens collected in each tube, shiftable means for delivering tokens into either one of said tubes; token actuated means acting, when a predetermined number of tokens in one tube have accumulated therein to a predetermined height, to automatically shift the delivery means from a position over the filled tube to a position over the empty tube, said means including a normally open operating circuit, opposed solenoids in said circuit having a common core, means operatively connecting the core with said delivery means, the token actuated means acting to automatically close said circuit through one of the solenoids to shift the core from the other solenoid into the first named solenoid and thereby shift said delivery means.

7. A tabulator including two parallel display tubes of non-conductive material constructed and arranged to receive tokens and support them within the tube in approximately alined superposed position, the tubes having an internal diameter slightly greater than the diameter of the tokens, metallic tokens for use in the said tubes; graduations visually associated with the tubes and indicating the number of tokens collected in a tube, shiftable means for delivering tokens into either one of said tubes, said means being shiftable to discharge alternately into the display tubes, token actuated means acting, when the tokens in one tube have accumulated therein to a predetermined height, to automatically shift the delivery means from the filled tube to a discharging position over the other or empty tube, said means including a pair of opposed solenoids, a core common to said solenoids and operatively connected to said shiftable delivery means to shift it upon a movement of the core from one solenoid to the other, a conductive member mounted upon the upper end of each tube and with which the uppermost token in the tube will contact, and a conductive head mounted above both tubes and with which the uppermost token will electrically engage when a tube is filled with tokens, the head being electrically connected to a source of current and the solenoids.

8. A tabulator including two parallel display tubes constructed and arranged to receive tokens and support them within the tube in approximately alined superposed position, metallic tokens for use in said tubes, the tubes having an internal diameter slightly greater than the diameter of the tokens, graduations visually associated with the tubes and indicating the number of tokens collected in a tube, a metallic head disposed above the pair of tubes and having openings registering therewith, means for delivering tokens into either one of said openings and shiftable alternately into register with one or the other of the said openings in the head, a pair of solenoids having a common core therefor shiftable from one solenoid to the other, means operatively connecting the core to said delivery means, a metallic element disposed at the upper end of each of said tubes, one of said metallic elements being connected in a normally open circuit with one of said solenoids and a source of potential, and the other of said metallic elements being connected in a normally open circuit with the source of potential and the other of said solenoids, whereby the topmost token, when a display tube has been filled with tokens, will electrically engage the head and the conductive element at the upper end of the corresponding display tube closing the circuit through the solenoid to shift said delivery means into discharge position over the other display tube; and means actuated by the delivery means and upon a shifting movement thereof releasing the tokens from the filled tube.

9. A tabulator including two parallel display tubes constructed and arranged to receive tokens and support them within the tube in approximately alined superposed position, metallic tokens for use in said tubes, the tubes having an internal diameter slightly greater than the diameter of the tokens, graduations visually associated with the tubes and indicating the number of tokens collected in a tube, a metallic head disposed above the pair of tubes and having openings registering therewith, means for delivering tokens into either one of said tubes and shiftable alternately into register with one or the other of the openings in the head, a pair of solenoids having a common core therefor shiftable from one solenoid to the other, means operatively connecting the core to said delivery means to shift it, a metallic element disposed at the upper end of each of said tubes, one of said metallic elements being connected in a normally open circuit with one of said solenoids and a source of potential, the other of said metallic elements being connected in a normally open circuit with the source of potential and the other of said solenoids whereby the topmost token, when a tube has been filled with tokens, will electrically engage the head and the conductive element at the upper end of the corresponding tube closing the circuit through the solenoid to shift said delivery means; means actuated by delivery means upon a shifting movement thereof releasing the tokens from the filled tube, said releasing means including a pair of gates one for each of the tubes disposed at the lower ends thereof, a pair of gate operating solenoids having a common core, means operatively connecting said core to the gates to cause the opening of one gate and the simultaneous closing of the other gate when one or the other of the last named solenoids is energized, normally open switches connected in circuit each with one of said solenoids and a source of potential, and means actuated by the delivery means upon a movement thereof acting to close the circuit through one or the other of said switches and the associated solenoid to thereby cause the shifting of one gate to an open position and the shifting of the other gate to a closed position.

10. A tabulator including two parallel display tubes constructed and arranged to receive tokens and support them within the tube in approximately alined superposed position, metallic tokens for use in said tubes, the tubes having an internal diameter slightly greater than the diameter of the tokens, graduations visually associated with the tubes and indicating the number of tokens collected in a tube, a metallic head disposed above the pair of tubes and having openings registering therewith, means for delivering tokens into either one of said tubes and shiftable alternately into register with one or the other of the openings in the head, a pair of solenoids having a common core therefor shiftable from one solenoid to the other, means operatively connecting the core to said delivery means, a metallic element disposed at the upper end of each of said tubes, one of said metallic elements being connected in a normally open circuit with one of said solenoids and a source of potential, the other of said metallic elements being connected in a normally open circuit with the source of potential and the other of said solenoids whereby the topmost token, when a tube has been filled with tokens, will electrically engage the head and the conductive element at the upper end of the corresponding tube closing the circuit through the solenoid and shifting said delivery means; means actuated by the delivery means upon a shifting movement thereof releasing the tokens from the filled tube, said means actuated by the delivery means including a pair of gates one for each of the tubes and disposed at the lower ends thereof, a pair of solenoids having a common core, means operatively connecting said core to the gates to cause the opening of one gate and the simultaneous closing of the other gate when one or the other of the last named solenoids is energized, normally open switches connected in circuit each with one of said solenoids and a source of potential, means actuated by the delivery means upon a movement from one position to the other acting to close the circuit through one or the other of said switches and the associated solenoid to thereby cause the shifting of one gate to an open position and the shifting of the other gate to a closed position, and means automatically breaking the circuit through the energized solenoid when the core has been drawn into the energized solenoid.

11. A tabulator including two parallel display tubes constructed and arranged to receive tokens and support them within the tubes in approximately alined superposed position, the tubes having an internal diameter slightly greater than the diameter of the tokens, metallic tokens for delivery into said tubes, graduations visually associated with the tubes and indicating the number of tokens collected in a tube, a delivery chute pivoted at its upper end for swinging movement to carry its lower end into register with either one of said tubes, a metallic head disposed immediately above the upper ends of the tubes and having openings registering therewith and through one or the other of which openings the delivery chute discharges, a metallic element disposed on the inside of each tube at the upper end thereof but out of contact with said head, a pair of solenoids, a core common thereto, a lever connected at one end to the delivery tube and at the other end to said core whereby, when the core shifts from one solenoid to the other, the delivery tube will be swung from one opening of the head to the other, each of said metallic members being connected in a circuit with one of said solenoids, a source of potential and said head, whereby, when the tokens have reached a predetermined height in one of said tubes, uppermost token will form a metallic connection between the corresponding metallic element and the head to thus close a circuit through the corresponding solenoid to shift the delivery chute over the empty display tube.

12. A tabulator including two parallel display tubes constructed and arranged to receive tokens and support them within the tubes in approximately alined superposed position, the tubes having an internal diameter slightly greater than the diameter of the tokens, metallic tokens for delivery into said tubes, graduations visually associated with the tubes and indicating the number of tokens collected in a tube, a delivery chute pivoted at its upper end for swinging movement to carry its lower end into register with either one of said tubes, a metallic head disposed immediately above the upper ends of the tubes and having two openings registering with the respective tubes and through which openings the delivery chute discharges, a metallic element disposed on the inside of each tube at the upper end thereof but out of contact with said head, a pair of solenoids, a core common thereto, a lever connected at one end to the delivery tube and at the other end to said core whereby, when the core shifts from one solenoid to the other, the delivery tube will be swung from one opening of the head to the other, each of said metallic elements being connected in a circuit with one of said solenoids, a source of potential and said head, whereby, when the tokens have reached a predetermined height in one of said tubes, they will form a metallic connection between the corresponding metallic element and the head to thus close a circuit through the corresponding solenoid to shift the delivery chute over the empty display tube, a totalizing display tube, a slide movable across the upper end of the totalizing display tube and having two openings, a delivery chute for the totalizing display tube and discharging tokens into one or the other of said openings, means disposed in alinement with the last named delivery chute preventing the discharge of a token from said slide until the slide has been shifted to carry an opening of the slide out of alinement with the corresponding delivery chute, and means operatively connecting the first named delivery chute with the slide to cause the reciprocation of said slide upon each swinging movement of the first named delivery chute.

13. In an apparatus of the character described, a token receiving display tube open at its upper end and constructed and arranged to support tokens in approximately alined superposed position, means normally closing the lower end of said display tube, graduations visually associated with said display tube to indicate the number of tokens collected therein, the display tube having a downwardly extending branch intersecting the tube at a distance from its lower end equal to the height of a predetermined number of tokens whereby when the tokens have collected in the display tube to the height of said branch, the topmost token in the display tube will deflect tokens dropping into the upper end of said display tube into said branch, and graduations associated with said branch and indicating the number of tokens collected in the branch.

14. A tabulator including a token receiving display tube open at its upper end and constructed and arranged to support the tokens in approximately superposed alined position within the tube, the display tube having a downwardly and laterally extending branch tube intersecting the display tube at a distance from the lower end of the display tube equal to the height of a predetermined number of tokens in the display tube whereby when the tokens have collected in the display tube to the height of said branch, the topmost token in the display tube will deflect any other tokens dropping into the display tube into said branch, both the display tube and the branch having graduations visually indicating the number of tokens collected therein, that portion of the display tube above the branch extending at an angle to that portion of the display tube below the branch, the angle of the display tube above the branch being reverse to the angle of the branch.

15. A tabulator, including two token receiving tubes constructed and arranged to receive tokens and support them within the tube in approximately alined superposed position, the tubes having an internal diameter slightly greater than the tokens, a movable token delivery element mounted for movement to bring it into or out of delivery position with the upper end of either of the receiving tubes, means controlled by the uppermost token when the tokens in one tube have accumulated therein to a predetermined height acting to automatically shift the token delivery acting to from the last named tube to a delivery element position with relation to the other tube, and means acting automatically upon a movement of the token delivering element from a filled tube to an unfilled tube to release the tokens in the filled tube.

THOMAS A. KIRTON.